United States Patent
Wu et al.

(10) Patent No.: US 10,719,489 B1
(45) Date of Patent: Jul. 21, 2020

(54) CUSTOM VIDEO METRICS MANAGEMENT PLATFORM

(71) Applicant: Conviva Inc., Foster City, CA (US)

(72) Inventors: Haijie Wu, San Mateo, CA (US); Snehal Karia, Foster City, CA (US); Pawas Ranjan, Delhi (IN); Faisal Zakaria Siddiqi, San Jose, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 16/022,214

(22) Filed: Jun. 28, 2018

Related U.S. Application Data

(63) Continuation of application No. 14/961,646, filed on Dec. 7, 2015, now Pat. No. 10,067,955.

(60) Provisional application No. 62/089,161, filed on Dec. 8, 2014.

(51) Int. Cl.
*G06F 16/21* (2019.01)
*G06F 8/65* (2018.01)
*G06F 16/22* (2019.01)
*G06F 16/28* (2019.01)

(52) U.S. Cl.
CPC ............ *G06F 16/211* (2019.01); *G06F 8/65* (2013.01); *G06F 16/22* (2019.01); *G06F 16/285* (2019.01); *G06F 16/288* (2019.01)

(58) Field of Classification Search
CPC ...... G06F 16/211; G06F 16/22; G06F 16/285; G06F 16/288; G06F 8/65
See application file for complete search history.

(56) References Cited

U.S. PATENT DOCUMENTS

| | | | |
|---|---|---|---|
| 5,539,907 A | 7/1996 | Srivastava | |
| 5,732,273 A | 3/1998 | Srivastava | |
| 6,128,628 A | 10/2000 | Waclawski | |
| 6,360,360 B1 | 3/2002 | Bates | |
| 7,373,415 B1 * | 5/2008 | DeShan | H04L 43/50 709/231 |
| 8,402,494 B1 | 3/2013 | Hu | |
| 8,489,923 B1 | 7/2013 | Lakshminarayanan | |
| 8,874,725 B1 | 10/2014 | Ganjam | |
| 9,584,395 B1 | 2/2017 | Rapoport | |
| 2003/0009709 A1 * | 1/2003 | Belenger | G06F 11/3664 714/37 |
| 2003/0110382 A1 | 6/2003 | Leporini | |
| 2004/0268318 A1 * | 12/2004 | Sirbu | G06F 11/2257 717/131 |

(Continued)

OTHER PUBLICATIONS

Adobe Marketing Cloud, "Measuring Video in Adobe Analytics", Feb. 5, 2015.

*Primary Examiner* — Phillip H Nguyen
(74) *Attorney, Agent, or Firm* — Van Pelt, Yi & James LLP

(57) ABSTRACT

Data collection management is disclosed. A data collection configuration is obtained. The data collection configuration is translated into executable code in a language usable to collect data. Data is collected using the executable code. The collected data values are provided as output. Metrics management is also disclosed. A configuration of a metric is obtained. The metric configuration includes a definition of how computation of the metric is to be performed and a mapping between a computation input and collected data. Collected data values are obtained based at least in part on the mapping. Metric values are computed according to the definition. One or more results associated with the computed metric values are stored.

16 Claims, 9 Drawing Sheets

(56) References Cited

U.S. PATENT DOCUMENTS

| | | | |
|---|---|---|---|
| 2005/0012563 A1* | 1/2005 | Kramer | H04H 60/372 333/125 |
| 2006/0140107 A1 | 6/2006 | Kanegae | |
| 2006/0206874 A1 | 9/2006 | Klein | |
| 2006/0248524 A1 | 11/2006 | Seely | |
| 2006/0281541 A1 | 12/2006 | Nguyen | |
| 2008/0063369 A1 | 3/2008 | Kim | |
| 2008/0198757 A1 | 8/2008 | Dan | |
| 2010/0205137 A1 | 8/2010 | Barsness | |
| 2010/0293190 A1 | 11/2010 | Kaiser | |
| 2010/0299661 A1 | 11/2010 | Citron | |
| 2011/0047531 A1 | 2/2011 | Wang | |
| 2012/0005527 A1* | 1/2012 | Engel | H04H 60/64 714/15 |
| 2015/0169435 A1 | 6/2015 | Wu | |
| 2015/0286491 A1 | 10/2015 | Anyuru | |
| 2015/0304737 A1 | 10/2015 | Franklin | |
| 2016/0112295 A1* | 4/2016 | Blankenship | H04L 41/0806 709/224 |

* cited by examiner

200

202:
```
{
  "playHeadTime": {
    "Android": {
      "func": "getCurrentPosition",
      "frequency": 20
    }
  }
}
```

204:
```
{
  "percentageComplete": {
    "formula": "(MAX(playHeadTime) - MIN(playHeadTime)) / contentLength"
  }
}
```

FIG. 2

CUSTOM VIDEO METRICS MANAGEMENT PLATFORM

CROSS REFERENCE TO OTHER APPLICATIONS

This application is a continuation of co-pending U.S. patent application Ser. No. 14/961,646 entitled CUSTOM VIDEO METRICS MANAGEMENT PLATFORM filed Dec. 7, 2015, which claims priority to U.S. Provisional Patent Application No. 62/089,161 entitled CUSTOM VIDEO METRICS MANAGEMENT PLATFORM filed Dec. 8, 2014 which is incorporated herein by reference for all purposes.

BACKGROUND OF THE INVENTION

Users are increasingly using networks such as the Internet to access content, such as video files and live streaming/video on demand content, via client machines. As demand for such content increases, there are challenges in distributing that content efficiently and with high quality. As one example, existing techniques for remotely determining information about players are limited in the information they are able to obtain about the players.

BRIEF DESCRIPTION OF THE DRAWINGS

Various embodiments of the invention are disclosed in the following detailed description and the accompanying drawings.

FIG. 2 illustrates an example embodiment of a configuration file.

DETAILED DESCRIPTION

Figure 1:
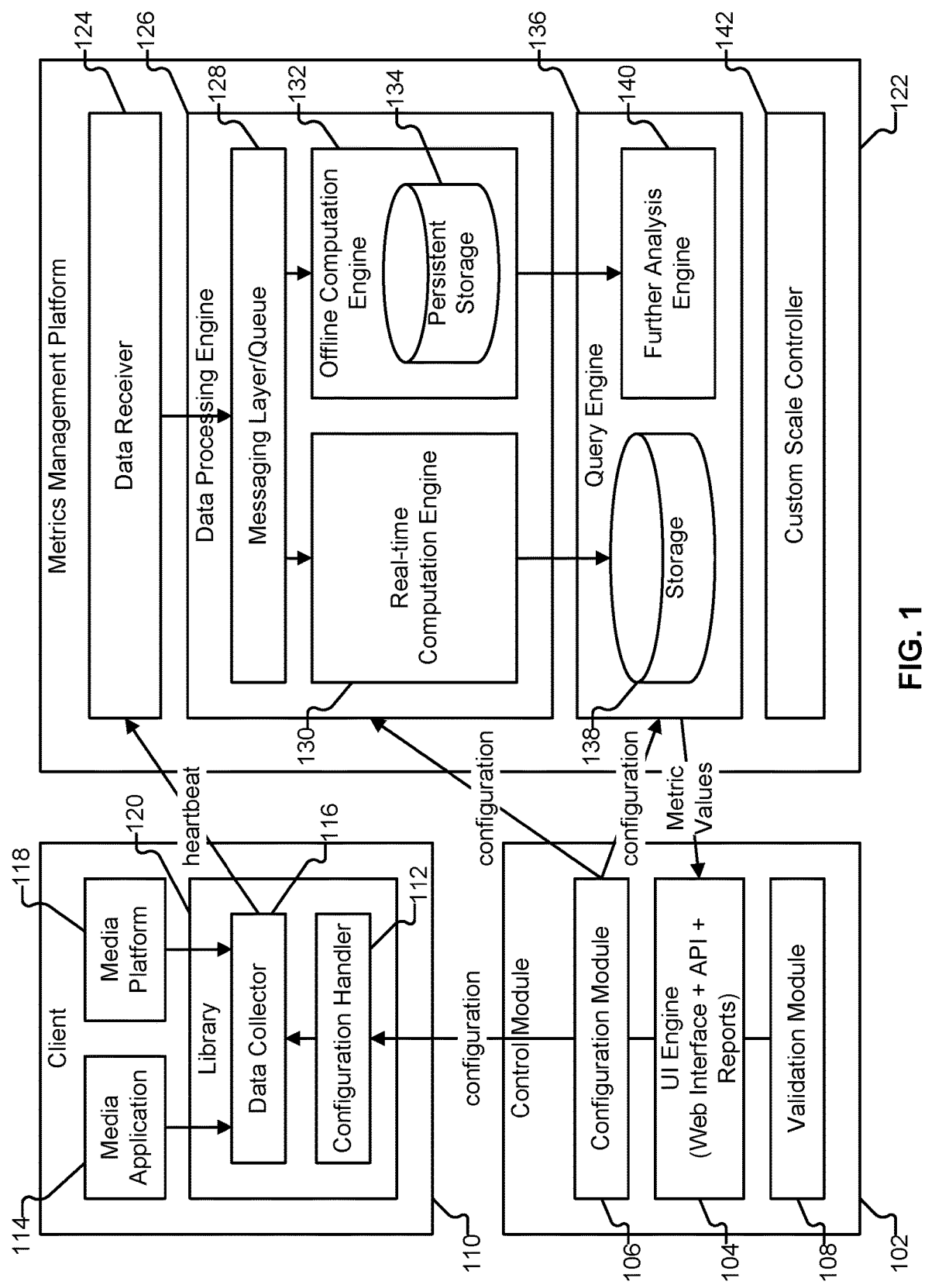
FIG. 1 illustrates an example embodiment of an environment in which custom video metrics configuration is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ubiquity of Internet, proliferation of Internet-enabled devices, and on-demand consumption of media (e.g., streaming video) have resulted in the generation of vast amounts of data. Entities such as content publishers, content providers, and service providers (e.g., Internet Service Providers (ISPs)) may wish to use such data to drive decisions, for example, by computing metrics and viewing reports.

Various issues and challenges exist with typical metrics creation and reporting systems. For example, entities that are dealing with data and using analytics tools for internal and external use often create their own set of metrics, with little to no standardization, causing fragmentation in metrics definition, visualization, and reporting. This can lead to inconsistencies.

As another example, customers/viewers of typical metrics creation and reporting systems are forced to use fixed sets of metrics, leading to inflexible systems being used to analyze data that may not satisfy customers' requirements.

As another example, such typical systems also do not scale, as defining, processing, and analyzing new metrics may take additional resources and time.

Typically, the implementation of new metrics to compute, or the collection of new types of data is a manual process, requiring code changes and multiple deployment iterations before the changes can be pushed out. This can lead to inefficiencies, such as delays in collecting new data and computing new metrics.

For example, mobile applications (referred to herein as "apps") are commonly used to stream video content. The apps can be configured to collect various data regarding content viewing. Suppose, for example, that a content provider/publisher associated with an app would like to collect a new type of data. Typically, the collection is hardcoded into a new version of the app, which is then deployed. The app release cycle may occur slowly however, and thus the new data may not be immediately collected. Additionally, even when the app is deployed/made available, end-users may not update the app immediately, or ever. Thus, the collection of the new data may be delayed, or never occur.

Described herein is a custom video metrics management platform that addresses issues and challenges such as those described above. As will be described in further detail below, using such a platform, custom configuration of new data to be collected from clients and/or the custom configuration of new metrics to be computed can be performed. In some embodiments, the metrics management platform provides a centralized configuration platform for configuring/controlling data collection and/or metric computation. Using such a platform as described herein, a variety of metrics can be computed to allow for collection, analysis, and reporting. As will be shown in further detail below, the techniques described herein provide flexibility in customizing the process of data collection, as well as flexibility in introducing new metrics.

As one example, suppose that a client has installed an app that is configured initially to collect a first set of performance information. Suppose that at a later time, a content provider associated with the app would like to collect a new type of data (also referred to herein as "raw data," "service statistics," "performance information," "quality information," and "telemetry data") that was not initially configured in the first set. Typically, as described above, collecting the new data would require that app updates be made, as well as the device end-user to update the app, before the new type of data can actually be collected. As will be shown below, using the custom video metrics management platform described herein, such collection can be configured dynamically and pushed on-demand to the client device. This allows data collection to be controlled without requiring action on the part of app developers and/or end-users.

Further, using the platform and the techniques described herein, feedback control and iterative processing can also be provided. For example, as described above, users of the platform can define what data they would like to collect and define what metrics they would like to compute. Suppose, for example, that after the new data and metrics are implemented and integrated, it is determined that changes should be made to the initial configuration (e.g., due to the results of the data collection/metric definition not matching to expected results). The platform and techniques described herein can be used to make corrections/configuration changes dynamically/on-demand. This allows, for example, for iterative debugging and analysis, and end-to-end configuration and data processing validation.

While example embodiments in a video streaming (e.g., live and on-demand streaming) ecosystem are described below, the techniques described herein can variously be adapted to accommodate any type of multimedia/audiovisual content distribution, as applicable.

FIG. 1 illustrates an example embodiment of an environment in which custom video metrics configuration is performed.

Suppose for example, that a content publisher, Acme Video, has been collecting playing time data and total content length data from players. Acme Video would like to build a new "Percentage Complete" metric that will measure/capture the percentage of the video that a user has watched. This will provide a measure of how engaged viewers are when watching content (e.g., whether the users actually watch content, simply skip through it, etc.). However, using the existing collected playing time and total content length would only provide a rough estimate of the percentage completion.

Thus, in order to build a new, more accurate, percentage completion metric (an example of which will be described below), a new type of data will also need to be collected. For example, in order to compute the new metric, it would be beneficial if a new type of information that has not been previously collected, "play head time" (representing the play position that a video player is on), could be collected.

In this example, in order to define the new metric and configure the collection of the new play head time data values, an employee (referred to herein as the "user") associated with Acme Video accesses control module 102 via a user interface (UI) provided by UI engine 104. The control module can be implemented as a standalone application and/or a browser-based client application executing on a client device and communicating with metrics management platform 122 (also referred to herein as the "backend"), as a part of the metrics management platform that sends display data to a client application, or a combination.

Examples of metric and data collection configurations are as follows.

Example Data Collection Configuration

As one example, suppose that when configuring the collection of the new play head time data values, the user uses the interface to specify example code snippet 202 of FIG. 2, reproduced below:

```
{
"playHeadTime": {
  "Android": {
    "func": "getCurrentPosition",
    "frequency": 20
    }
  }
}
```

In the above example code snippet, the user has provided a configuration of the new data to be collected. As shown, the user specifies the name of the new data to be collected as "playHeadTime." The operating system (or appropriate API) for this configuration is specified as well. In this example, the "playHeadTime" data is collected on Android devices by performing the function call "getCurrentPosition" (which can be the name of an appropriate API call for Android players). In this example, the frequency of the data collection is also specified (e.g., every 20 seconds). In some embodiments, the parameters of the data collection, such as the frequency of the data collection, are stored as metadata of the data collection configuration. As will be described in further detail below, client content players will collect data according to received data collection configuration files.

The above example snippet specified how the new playHeadTime data is collected on the Android mobile platform. The user can also specify other snippets for other operating systems/platforms/APIs. For example, in iOS, a different function (API) call may need to be performed to collect the values for the play head time. Although different function calls may need to be made for different operating systems/APIs, the values resulting from the function calls will be mapped to the same, common name "playHeadTime." This name will be used as an identifier for the values that are stored in the backend, which will be described in further detail below.

In some embodiments, users can also specify the segment of clients from which the new data values are to be collected. For example, the user can specify, on a per-client type basis (e.g., based on operating system, device type, geographical location, etc.), what segment of clients are to be instructed to collect the new "playHeadTime" data.

As will be described in further detail below, the data collection configuration is passed to/obtained by a client such as client 110, which is configured to collect the new type of data according to the data collection configuration, and pass the collected values to platform 122 for processing (e.g., to compute and store metric values).

Examples of client devices such as client 110 include personal computers, laptops, cellular phones/personal digital assistants, and other types of information appliances such as set-top boxes, game consoles, smart TVs, broadband routers, file servers, video servers, and digital video recorders, as applicable.

In some embodiments, clients such as client 110 are configured to play (e.g., stream) video content, which is in turn rendered on the client device (e.g., via an app, via a Flash, Silverlight, or HTML5 player if a web browser application is being used).

Example Metrics Configuration

In addition to configuration of data collection, the user also uses the control module 102 to configure the definition of the new percentage complete metric. As one example, the user specifies the metrics configuration as shown at 204 of FIG. 2, reproduced below:

```
{
  "percentageComplete": {
    "formula": "(MAX(playHeadTime)−MIN(playHeadTime))/contentLength"
  }
}
```

In this example, the new metric is assigned the name "percentageComplete." A definition of how the metric is computed is also shown. The definition includes a set of operations performed on inputs. As shown in this example, MAX and MIN are aggregation functions. As will be described in further detail below, the metric configuration is passed to platform 122, which is configured to compute metric values according to the definition provided in the metrics configuration.

As shown in this example, the value "playHeadTime" is used in the definition of the new metric. The use of the name maps/connects the input of the new metric computation to the newly collected data value, which is identified by the name "playHeadTime" that was specified in the data collection configuration. In some embodiments, the data values collected from clients are stored by the platform using the name "playHeadTime," and when the metric is computed, the appropriate data values are obtained by using the "playHeadTime" name as an identifier to perform a query (e.g., database query for "playHeadTime" values). Thus, the metric configuration provides a centralized mapping of the connection(s) between collected data and their use as inputs (in metric computation).

As shown, and as will be described in further detail below, both data collection from a video player and the backend/platform metric computations are customizable, where the newly collected information can be directly used in defining new metrics.

In some embodiments, validation is performed to ensure that each input in the metric definition maps/refers to data that has been collected or will be collected (e.g., as specified in a new custom data collection configuration). In some embodiments, an alert is provided (e.g., to the user via the UI) that the metric input does not match to known collected data (e.g., data with the name specified as a metric input does not exist/is not found).

In some embodiments, the configuration is also used by platform 122 to determine how computed metric values are stored. For example, the user can specify how they would like the results of metric computation to be presented, which is used to inform how the computed metric values are stored (e.g., the manner in which results are to be viewed/reported/presented/provided as output is used to drive how the values are stored).

As one example, the user can specify that the values should be stored as a time-series (e.g., stored as a daily value, every five minutes, etc.). For example, the user can specify that they would like an aggregated percentage completion value each day (e.g., every day sum of percentage completion). In some embodiments, such metrics configuration parameters are included in the metrics configuration as metadata.

As another example, the user can specify that the values are to be viewed as a distribution, for example, using a histogram. As one example, a user can configure ten buckets, with each bucket storing the number of plays for a different range of percentage completion values (e.g., one bucket for 0-10% completion, a second bucket for 10-20% completion, a third bucket for 20%-30% completion, etc.). The buckets can be used to group views (e.g., playback sessions) by percentage completion. As percentage completion values are computed for each view/playback session, the corresponding bucket is incremented accordingly. This allows the user to group views/streaming sessions based on percentage complete.

The original raw computed metric values can still be maintained. In this example, the raw computed metric values can be stored in a database column, where the name of the column is the name of the metric.

In some embodiments, users/customers can use group-bys to specify how to collect, split, and accumulate metrics. In some embodiments, group-bys can be nested or strung together to create more advanced metrics.

For example, online video data analytics can involve "sessions." In some embodiments, a session is a series of connected events that start when a user begins watching a video, and ends when the user stops or navigates away from the video. Based on this property, online video data processing can be associated with the two following example levels of group-bys. In the first example level, data is aggregated within a session. At the second example level, aggregation is performed across sessions. With the flexible data processing (e.g., metric computation) described above, users can customize both such aggregation levels.

Further details regarding computation and storage of metric values will be described in further detail below.

The data collection and metric configurations are then provided from the control module to platform 122 and clients such as client 110, respectively. In some embodiments, the configurations are sent as instructions. In some embodiments, a configuration file is generated based on the user configuration. In some embodiments, the data collection and the metric configurations are specified in a single configuration, which is then parsed and split accordingly (e.g., by the control module or by platform 122), where the data collection configuration portion is provided to the client (either directly to the client or by way of platform 122, which can be used as a relay, as described in further detail below), and the metric configuration portion is provided to platform 122. In other embodiments, data collection and metric configurations can be performed separately/independently of each other.

In the above example, the user uses a web interface to configure custom metrics and data collection. In other embodiments, an API can be used to perform custom configuration. For example, API calls can be made to the control module/metrics management platform to generate new data collection and/or metrics configurations and to transmit those configuration instructions to clients and/or platform 122, as appropriate.

Example Data Collection

The new data collection configuration is provided to a client such as client 110. In this example, the data collection configuration is passed from control module 102 to client 110 via platform 122. For example, the data collection configuration is passed from the control module to the platform (e.g., using HTTPS) over a network such as the Internet (not shown) to data receiver 124 of metrics management platform 122, which forwards the data collection configuration to clients such as client 110 (e.g., using HTTPS). In some embodiments, the data receiver is configured to transmit the data collection configuration to clients that match (e.g., based on attributes such as operating system, device type, geographical location, etc.) to a specified segment of clients from which the new data is to be collected. In one embodiment, data receiver 124 is implemented as an HTTP server gateway. In some embodiments, the configuration is directly provided to a client by the control module.

In some embodiments, the client is configured to check for new collection configurations (e.g., at startup of a media player or an app such as media application 114). For example, the client sends a first heartbeat message (described in further detail below) to the platform requesting the latest client configuration. In response, data receiver 124 provides the new data collection configuration instructions (e.g., originally received by the platform from control module 102). As one example, the client obtains the collection configuration using an HTTPs fetch instruction.

The data collection configuration is obtained and loaded by configuration handler 112 resident on the client 110. Upon receiving the configuration, the configuration handler uses the received data collection configuration to call the function in the configuration. In this example, suppose that client device 110 runs the Android operating system. The configuration handler 112 will call the function "getCurrentPosition" specified in the example configuration code snippet described above.

In some embodiments, the configuration handler is configured to translate the function call in the data collection configuration into a client side reflection-based call. For example, the configuration handler 112 generates the following code based on the contents of the data collection configuration code snippet described above:

Method m=MediaPlayer.class.getMethod("getCurrentPosition",null)

As shown in this example, the configuration handler has used the specified data in the configuration (e.g., "Android" and function call "getCurrentPosition") to generate code that will execute code in the language appropriate for the specified operating system/API. For example, because client 110 is an Android device, it will generate the example method call above using "getCurrent Position" that is usable in the Android operating system/API. If a corresponding configuration is specified for iOS devices and indicates the name of an API call to use to collect the playHeadTime value, the configuration handler resident on an iOS device will translate the configuration and generate code that will execute the appropriate function call usable in the iOS operating system/API.

In various embodiments, the configuration handlers installed on various clients are configured to support the translation of obtained data collection configuration into any player language or operating system/API, as appropriate. Thus, a single standardized data collection definition can be written, where configuration handlers installed on disparate clients of various types can translate the data collection definition into code that is in the language appropriate for them to perform data collection.

In the above example, the "user" specified the name of the function call to be performed for a given operating system/API, which was then used by the configuration handler to generate executable code that is in the language appropriate for the device that the configuration handler is resident on. In other embodiments, the configuration is specified to directly include the executable code for calling the named function (e.g., the method call "m" shown above), which can be directly executed by the configuration handler, without translation.

The executable code generated as a result of the language translation is then passed to data collector 116, which is configured to use the code to react/interact with media application 114 and/or media platform 118 to collect the requested data. In some embodiments, the media platform is a media processing engine, which may be integrated with an operating system (e.g., mobile operating system, desktop operating system, etc.). Examples of media platforms include AVFoundation (e.g., used with iOS), Windows Media Player, Gstreamer, etc. In this example, data collector 116 and configuration handler 112 are included in media library 120, which is integrated with media components 114 and 118.

The value returned from the function call executed by data collector 116 is then assigned to the named value (in this case "playHeadTime") specified in the data collection configuration. In this example, the data collector will collect this information every 20 seconds according to the example configuration shown above. The collected data will then be sent to platform 122 for further processing, which will be described in further detail below.

In some embodiments, data collector 116 is configured to perform pre-processing of the collected data, and place the result of the pre-processing into a nested data structure. In some embodiments, data collector 116 is configured to package the collected "playHeadTime" information and send the packaged information to platform 122. In one embodiment, the newly collected information is included in a heartbeat message that is transmitted to platform 122.

In some embodiments, a "heartbeat" message refers to a package/payload of status information that is sent from the client to the backend 122. In some embodiments, each heartbeat contains a snapshot of the session state at the time the heartbeat was sent out and a summary of the events and measurements since the last heartbeat or since the start of the session, as applicable. Using the custom data collection configuration techniques described herein, additional pieces of information can be dynamically collected and dynamically added to heartbeat messages.

In this example, the heartbeat message is transmitted to platform 122 over an agreed protocol, for example, via an HTTP rest call. In some embodiments, data collector 116 is configured to schedule sending of the collected data based on a policy specified in the custom data collection configuration.

Example Metric Computation and Storage

The heartbeat message from client 110 is received by data receiver 124 of platform 122. As will be described in further detail below, platform 122 is configured to use the collected data values included in the received heartbeat messages to perform metric computation. The metric computation is performed according to the metrics configuration described above. In some embodiments, the storage of the computed metric values is also performed based on the metrics configuration.

In some embodiments, data receiver 124 is configured to perform mapping, translation, and packaging of the received heartbeat message into an internal data structure. As one example, the gateway is configured to consolidate and normalize the data included in heartbeat messages (e.g., normalizing the "playHeadTime" data values collected from various clients of potentially disparate types into a standard form).

After the packaged heartbeat message is processed by data receiver 124, it is then sent to messaging layer (128) of data processing engine (126). As one example, the messaging layer is implemented as a Kafka messaging queue. Messaging layer/queue 128 is configured to distribute the heartbeat message to real-time computation engine 130 and offline computation engine 132. In some embodiments, the collected data included in the heartbeat, including the "playHeadTime" values, is also stored to persistent storage 134 included in offline computation engine 132 as raw data.

In this example, the real-time computation and offline computation engines are configured to compute values for the new percentage completion metric according to the example metrics configuration/definition above, which was provided to platform 122 from control module 102. As described above, the metrics configuration defines the metric to be computed, and includes the names/identifiers of collected data to be used as inputs in computing the metric value. In this example, the metrics configuration indicates that one of the input values is the newly collected data value "playHeadTime." The "playHeadTime" data values are obtained to perform metric computation.

Real-time computation engine 130 is configured to compute metric values in real-time, for example, as heartbeat messages are received. In this example, real-time computation engine 130 is configured to extract/collect "playHeadTime" data values from heartbeat messages, in real-time, as they are received by platform 122. For example, the "playHeadTime" values can be extracted using the name specified in the metrics configuration. In one example embodiment, real-time computation engine 130 is implemented using Apache Spark Streaming.

Offline computation engine 132 is configured to compute metric values offline (e.g., as part of a batch process). In some embodiments, the offline computation engine is configured to obtain input values from persistent storage 134 (where collected raw data is stored). In this example, the newly collected "playHeadTime" values that are extracted from heartbeat messages have been stored in persistent storage 134 to be made available at a later time. When the offline computation engine 132 performs metric computation, the names of the raw data values to be used as input values, as specified in the metrics configuration, are used to access and obtain data values from persistent storage 134. In various embodiments, offline computation engine 132 can be implemented using Spark, Hadoop, etc.

The metric values computed by real-time computation engine 130 and offline computation engine 132 are then stored. For example, the percentage completion values computed by real-time computation engine 130 and offline computation engine 132 are stored to storage 138 and further analysis engine 140 of query engine 136, respectively. In some embodiments, query engine 136 is configured to facilitate storage, querying, and analysis of computed metrics. In some embodiments, storage 138 and further analysis engine 140 are configured to store the computed values according to metrics configurations (e.g., provided as instructions by the configuration module 106), as described above.

For example, storage 138 and further analysis engine 140 are configured to read received storage configuration instructions. As one example, suppose that the user has specified that they would like to aggregate the computed percentage completion values and store them on a daily basis. Based on the storage specification, for example, storage 138 creates a new row for each daily aggregation of percentage completion values. Thus, each day, an overall percentage completion value is stored. As another example, the raw computed metric values can be stored in database columns, where the name of the column is the name of the metric, as specified in the metrics configuration. In this example, a database column in storage 138 can be instantiated with the name "percentageComplete." Metric values are then stored in the column as they are computed. In various embodiments, storage 138 is implemented as a Redis cache, using Phoenix, HBASE, etc.

In various embodiments, further analysis engine 140 is implemented using Hive, Spark SQL, etc. The further analysis engine is configured to perform further processing or facilitate further analysis of computed metric values (e.g., via data analytics).

Now that the computed percentage completion values have been stored, they can be accessed and, for example, presented to users. For example, the computed values can be presented to users via UI engine 104 of control module 102, which is configured to facilitate reporting. In some embodiments, the presentation of the computed metric values is based on the manner in which they are stored. For example, a custom dashboard can be created to view the percentage completion values that have been aggregated and stored on a per-day basis.

Thus, as shown in the above example, configuration can be performed across an entire content distribution system/ecosystem, from data collection, to metric computation, to storage of computed metric values, and to the user interface/data presentation layer. As shown above, collection and metric implementation instructions can be pushed to clients and the metrics management platform, providing control over data collection and/or metrics configuration. This can provide various benefits.

For example, content players can be configured for new data collection without, for example, requiring upgrade of player apps (which may be challenging due to app development cycles, end-users not installing updates, fragmentation, etc.).

As another example, suppose that a new version of a mobile operating system exposes a new piece of performance/telemetry/service information that was previously unavailable to be collected. Using the techniques described herein, the new data can be collected without changing a player application and/or without requiring the player application to be updated (e.g., as the configuration handler and data collector can be controlled to perform the collection).

In the above example of FIG. 1, both a new custom metric and a custom data collection were configured. The configuration of metrics and data collection can also be performed independently/separately of each other.

As one example, a user can define a new metric that uses existing, previously collected data as input. For example, suppose that bitrate switch events have already been collected from players into the backend 122. The user would like to define a new metric that calculates the rate of bitrate switches. The user can do so by defining the new custom metric as described above.

A user can also define the collection of a new piece of data without specifying a custom new metric. For example, the new data can be collected using the techniques described herein and stored (e.g., in persistent storage 134 of FIG. 1) as raw data. The collected data can then be used at a later time to compute various metrics (whether custom configured, generic, default, etc.).

As one example, suppose that a new 3D touch capability has been introduced for the iOS that has recently been released. The content provider does not yet have a metric that would utilize such new data, but would like to collect it in the meantime. The user associated with the content provider can use the control module, as described above, to configure collection of the new 3D touch data.

The following is an example code snippet that can be specified for collecting the 3D touch data.

```
{
  "3DTouchEvent": {
    "iOS": {
      "func": "ios.screen.3DTouch",
    }
  }
}
```

The configuration of the new data collection is obtained by client devices, as described above, which are configured to translate the data collection configuration into executable code to collect the new data. The data is then sent to a platform such as platform 122 of FIG. 1, where it can be stored as raw data. The collected data can then be used at a later time as input when computing various metrics. The collected data can also be used as input to metric computations that are not custom configured, such as default or generic computations that are built in or already available (and do not need to be newly defined). For example, a predefined aggregation such as a "sum" operation can be applied to the newly collected data. As another example, the raw data can be used at a later time for offline computation (e.g., using offline computation 132 of FIG. 1).

FIG. 2 illustrates an example embodiment of a configuration file. In this example, configuration file 200 includes data collection configuration 202 and metrics configuration 204, described in further detail above in conjunction with the example environment of FIG. 1.

Figure 3:
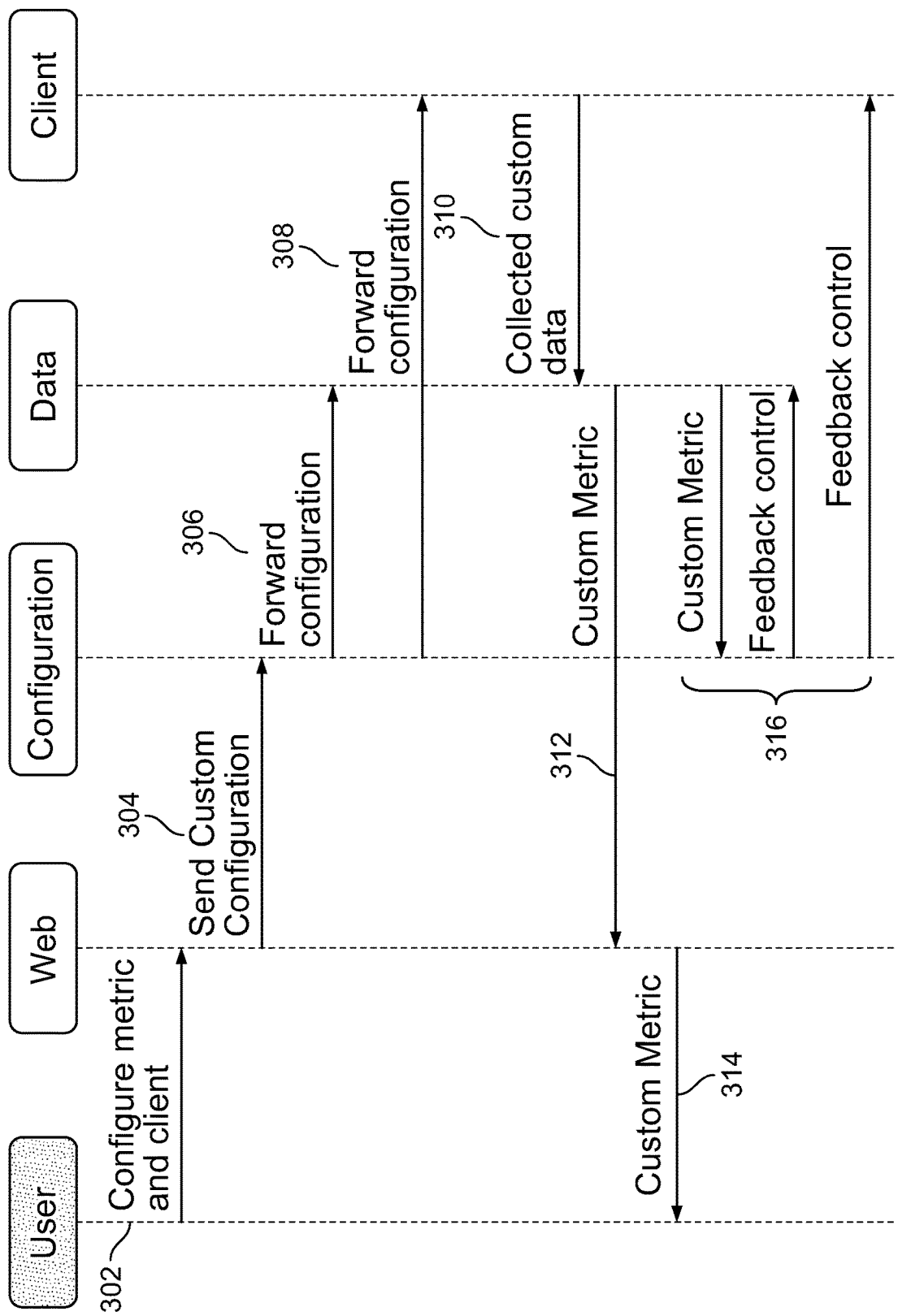
FIG. 3 illustrates an example data flow for data collection and metric configuration.

FIG. 3 illustrates an example data flow for data collection and metric configuration. In this example, a user configures a custom metric and/or client data collection at 302, for example, using a web UI or API, as described above. At 304-308, the custom metric and/or the data collection configuration, examples of which are provided above in conjunction with the example environment of FIG. 1 and in FIG. 2, is transmitted/provided to various components, such as clients (e.g., client 110 of FIG. 1) and a backend such as a metrics management platform (e.g., platform 122 of FIG. 1), as appropriate.

When the client receives the data collection configuration, the client uses the obtained configuration to collect the custom configured data, which is sent back to metrics management platform 122 at 310. As one example, the collected data is then sent to the platform for storage and/or data processing as described above (e.g., real-time computation, offline computation, storage, further analysis, etc.) according to the custom metric configuration. The platform utilizes the custom metric configuration to compute custom metric values.

At 312, computed metric values can then be fed back (e.g., to a control module such as control module 102 over a network such as the Internet) and presented to the user at 314, for example, via a web UI. For example, the metrics can be provided in a dashboard report.

As will be described in further detail below, feedback control 316 allows for validation (e.g., end-to-end validation), where users can validate the results of the custom data and/or metrics configuration. For example, computed metrics values can be monitored/evaluated/analyzed and used as feedback to determine whether any adjustments to data collection and/or metrics configuration should be made.

The feedback control also allows for resource scaling, which will also be described in further detail below. For example, the resources utilized in processing collected data and/or computing new metrics can be evaluated/monitored and used as feedback in determining if resource scaling should be performed.

Data Collection Configuration

Figure 4A:
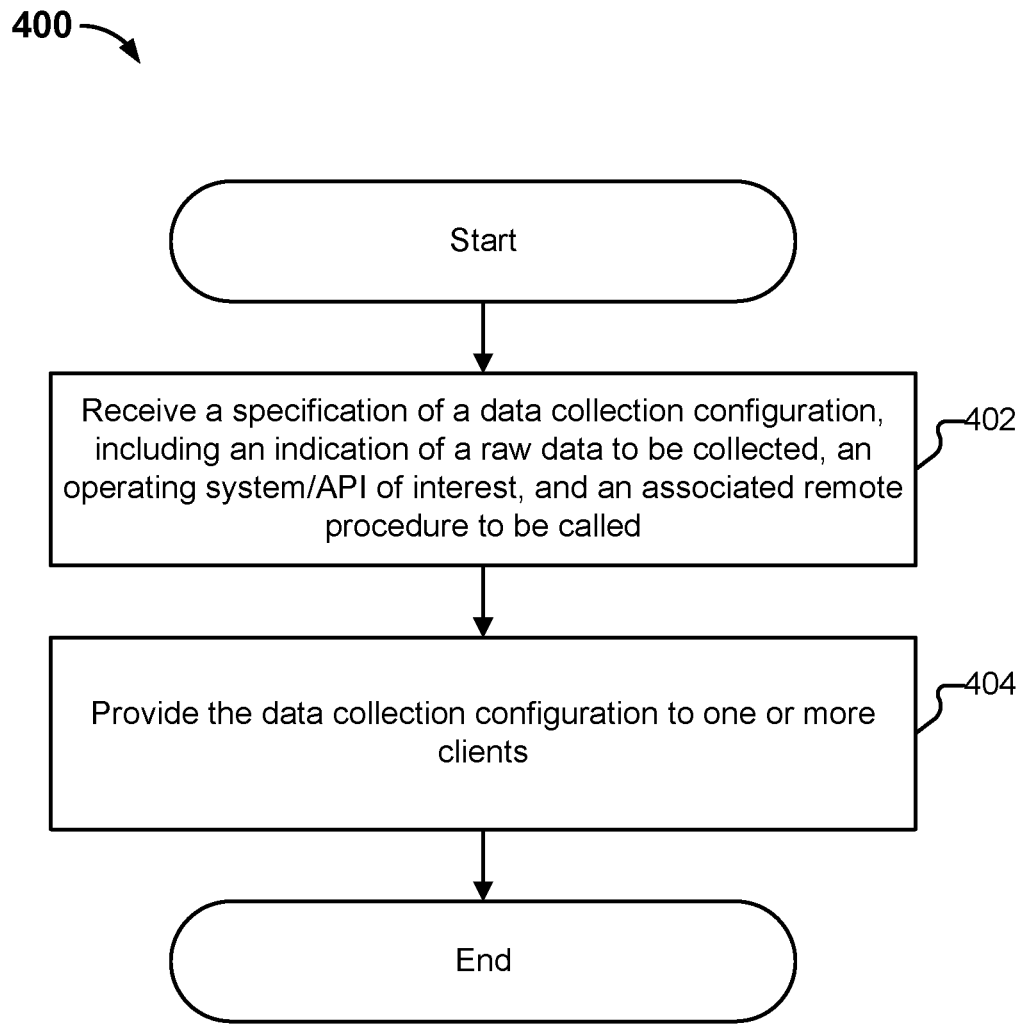
FIG. 4A is a flow diagram illustrating an embodiment of a process for configuring data collection.

FIG. 4A is a flow diagram illustrating an embodiment of a process for configuring data collection. In some embodiments, process 400 is executed by control module 102 of FIG. 1. The process begins at 402 when a specification of a data collection configuration is received. In various embodiments, the specification of the data collection configuration is obtained via a user interface (e.g., web UI), an API, as described above, etc.

In some embodiments, the specification includes a specification of the data to be collected, such as the name (or any other appropriate identifier) to which the new collected data values are to be assigned. The specification can also include a specification of an operating system/API of interest and an indication of a corresponding function call/remote procedure call. In some embodiments, the indication of the function call is a name of a function call compatible with the specified operating system/API that, when executed by a client, collects the requested data value. For example, after receiving the configuration, the client is configured to translate the metrics configuration into code that is executable on the operating system/appropriate for the specified API. The code, when executed, executes the specified function call, which causes the requested data to be obtained/collected.

In some embodiments, the specification of the metrics configuration includes parameters indicating how the new data is to be collected. As one example, a frequency (e.g., time driven basis) of collection can be specified. In some embodiments, such parameters are included as metadata in a data collection configuration.

At 404, instructions are provided to one or more clients. In some embodiments, a configuration file including the data collection specification is provided to content players residing on clients. In some embodiments, the clients/content players to which the data collection configuration is transmitted/otherwise provided are determined based on a specified segment definition. For example, a segment of clients from which the data should be collected can be specified. The segment can be defined based on a set of attributes/characteristics of the segment, such as device type, content player type, operating system (version), etc. In some embodiments, the data collection configuration is pushed to clients directly. In other embodiments, the data collection configuration is transmitted first to a backend such as platform 122. The data collection configuration is then provided to/fetched by the client in response to a client request for any new/latest data collection configurations (e.g., if available).

Metrics Configuration

Figure 4B:
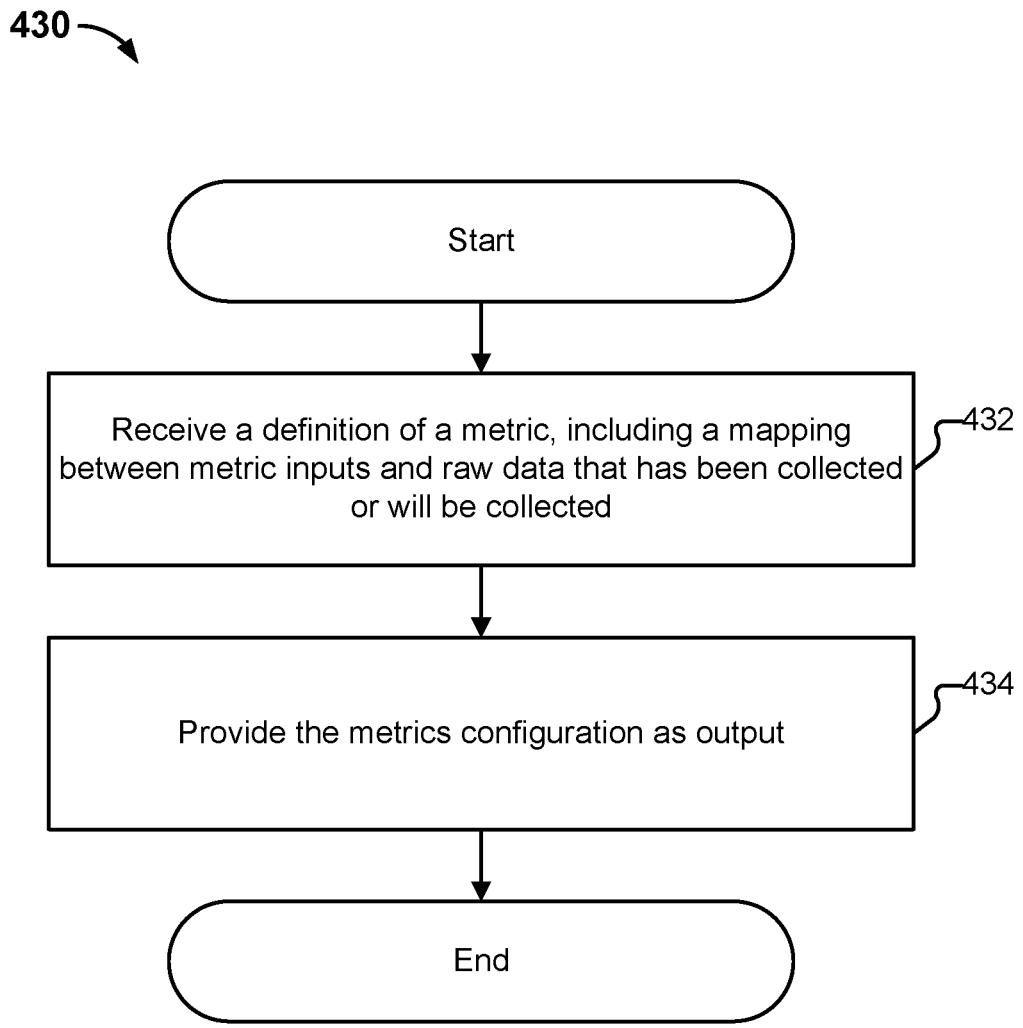
FIG. 4B is a flow diagram illustrating an embodiment of a process for metric configuration.

FIG. 4B is a flow diagram illustrating an embodiment of a process for metric configuration. In some embodiments, process 430 is executed by control module 102 of FIG. 1. The process begins at 432 when a definition of a metric to be computed is received. In various embodiments, the definition of the metrics configuration is obtained via a user interface (e.g., web UI), an API, as described above, etc.

In some embodiments, the metric configuration includes a name (or any other appropriate identifier) of the metric being configured. In some embodiments, the metric definition includes a formula/function that indicates how collected data values/existing metric values are to be combined together to compute a value. For example, the metric is defined using a set of operations to be performed using collected data values. In some embodiments, the definition indicates a mapping between metric inputs and collected data values. For example, the inputs of the metric formulation can be specified using the name (or any other appropriate identifier) of collected raw data values (where the name of the data value to be used as input maps collected data values to the input of the metric to be computed). The raw data values can include those that are already being collected, as well as those that will be collected (e.g., specified using the data collection configuration described above).

In some embodiments, the metric definition includes a specification of how computed metric values are to be represented in storage. For example, as described above, computed metric values can be stored as an aggregation (e.g., sum), on a time driven basis (e.g., daily sum), as a distribution (e.g., using a histogram), etc. In some embodiments, the storage specification is based on an indication of how metric values are to be presented (e.g., in dashboards, reports, etc.). For example, a user can specify that they would like to view computed metric values as an aggregation, on a time driven basis, as a distribution, etc., as described above. In some embodiments, explicit storage configuration need not be specified, and computed metric values can be stored in a default manner (e.g., as a database column with the name specified for the metric being configured).

In some embodiments, validation is performed on the metrics configuration. For example, it can be determined whether indicated data values to be used as input to the metric computation are valid (e.g., exist). For example, the names of the data to be used as input are checked against a set of data/metric value names that have been collected/computed and/or will be collected/computed. If the specified data for input is not available, then in some embodiments, notifications can be sent to alert users of the invalid metric computation input.

At 434, instructions are provided based on the metric configuration definition. For example, the metrics configuration is provided to a platform such as metrics management platform 122 of FIG. 1. In some embodiments, computation and/or storage of metric values is performed according to the metrics configuration.

Configuration of Data Collection and Metrics

Metrics and data collection configuration can be performed separately/independently of each other, for example, using processes 400 and 430 of FIGS. 4A and 4B, respectively. As shown in the example environment of FIG. 1, both data collection and metrics configuration can also be performed concurrently, where the metrics configuration references/uses as input a data value that is to be collected.

Figure 4C:
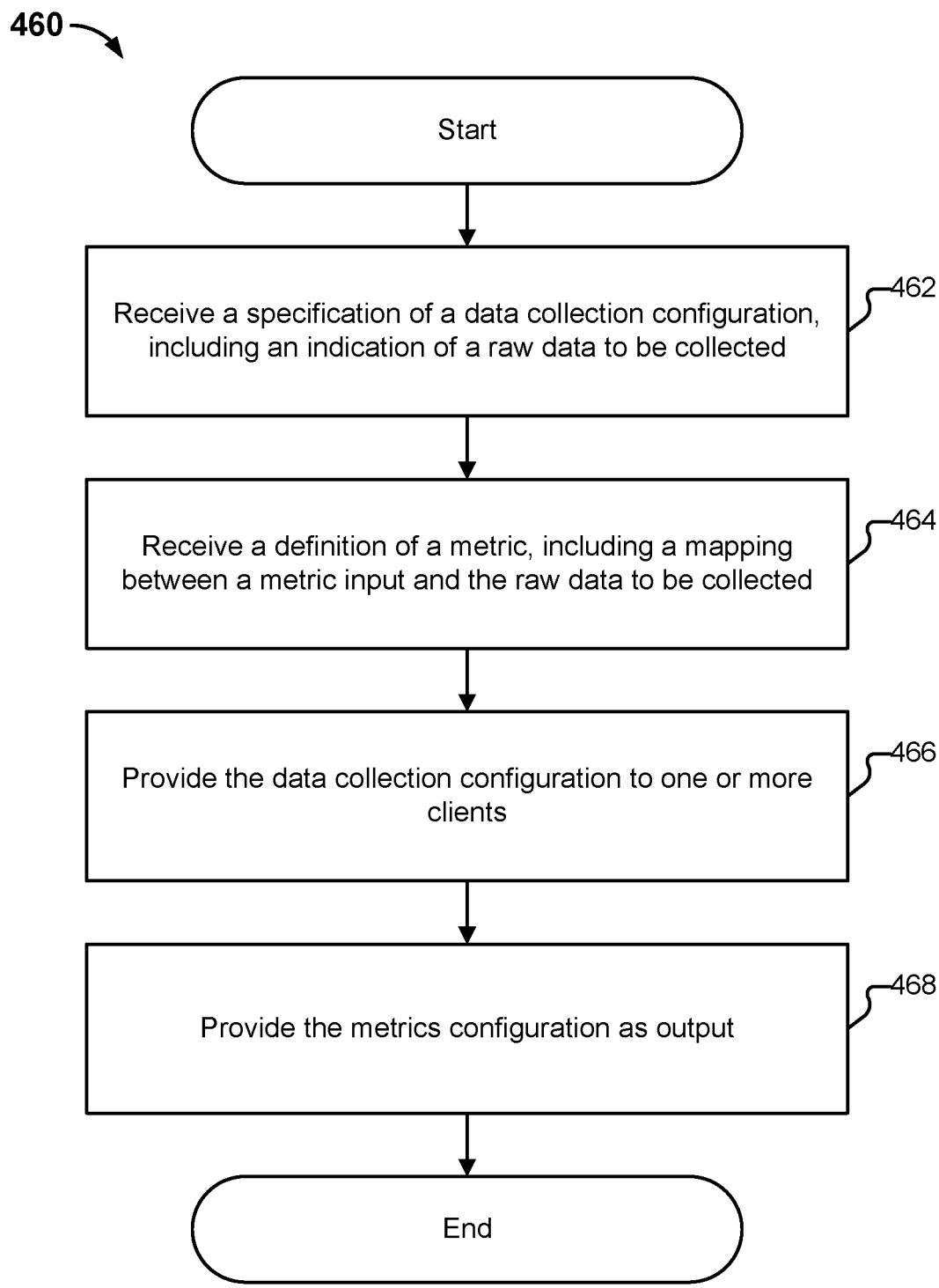
FIG. 4C is a flow diagram illustrating an embodiment of a process for configuring data collection and metric configuration.

FIG. 4C is a flow diagram illustrating an embodiment of a process for configuring data collection and metric configuration. In some embodiments, process 460 is executed by control module 102 of FIG. 1. The process begins at 462 when a specification of a data collection configuration is received. The data configuration includes an indication of raw data to be collected. In some embodiments, process step 462 is implemented using process step 402 of process 400 of FIG. 4A. At 464, a definition of a metric is received, including a mapping between a metric input and the raw data to be collected, as specified at 462. In some embodiments, process step 464 is implemented using step 432 of process 430 of FIG. 4B.

At 466, the data collection configuration is provided to one or more clients. In some embodiments, process step 466 is implemented using process step 404 of FIG. 4A. At 468, the metrics configuration is provided as output. In some embodiments, process step 468 is implemented using process step 434 of process 430 of FIG. 4B.

Data Collection

Figure 5:
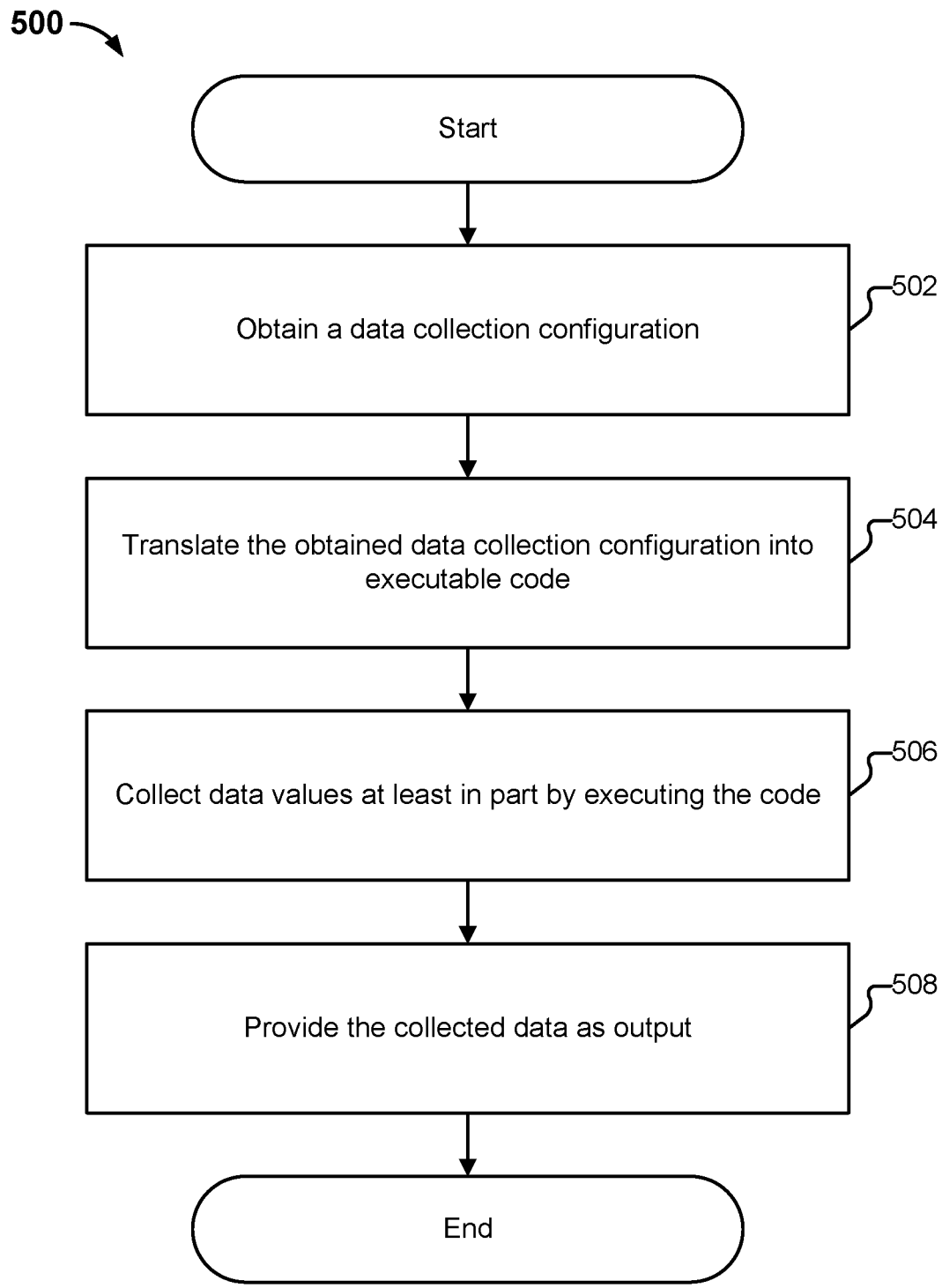
FIG. 5 is a flow diagram illustrating an embodiment of a process for performing custom data collection.

FIG. 5 is a flow diagram illustrating an embodiment of a process for performing custom data collection. In some embodiments, process 500 is executed by a client such as client 110 of FIG. 1. The process begins at 502, when a data collection configuration is obtained. The data collection configuration includes a specification of a data to collect. An example of a data collection configuration is shown at 202 of configuration 200 of FIG. 2, and described above in conjunction with the example environment of FIG. 1. In some embodiments, the data collection configuration is configured using processes such as processes 400 and 460 of FIGS. 4A and 4C, respectively.

In some embodiments, the data collection configuration is fetched. For example, a client sends a first heartbeat message (described above) to a platform/backend such as metrics management platform 122. In response, the platform provides the data collection configuration to the client (e.g., latest data collection configuration received from a control module such as control module 102 of FIG. 1). In some embodiments, the data collection configuration includes the specified name for the data value to be collected. The data collection configuration also includes an indication of an operating system/platform/API (which can be indicated by a corresponding operating system). The data collection configuration also includes an identifier (e.g., name) of the function call usable in the indicated operating system/API to collect the requested data value. In some embodiments, the data collection configuration includes specifications of function calls for different types of operating systems/APIs, all of which are associated with the same, common collected data value name (i.e., although data values will be collected using different function calls for different operating systems/APIs on different clients, they will be assigned the same, shared, and common name).

At 504, the data collection configuration is translated into operatable code of an appropriate language. For example, a configuration handler such as configuration handler 112 of client 110 determines the operating system/API of the client on which it is resident, or the API that is usable given the configuration of the client. The configuration handler then looks up, in the data collection configuration, the function to be called for the operating system/API of the client. In some embodiments, the indication of the operating system/API and the function call are used to generate executable code usable with the operating system/API of the client that when executed, collects the requested data value. As another example, the configuration is translated into code that is in the language of the player resident/installed on the client. One example of generated code translated from the data collection configuration is an API call. An example of such executed code is described above in conjunction with the example environment of FIG. 1.

In some embodiments, the exact code (e.g., API call) to be executed is specified in the data collection configuration. In such a scenario, translation need not be performed, and the exact code can be directly executed to perform data collection.

At 506, the code is executed and used to collect the specified data. For example, a data collector such as data collector 116 of FIG. 1 is configured to execute the code and collect data values from media components such as a media application, player, platform, etc. In some embodiments, the collected data values are collected at a frequency specified in the data collection configuration. In some embodiments, the data values collected using the executed code are assigned the name specified in the data collection configuration.

At 508, the collected data is provided as output. In some embodiments, the collected data values are packaged into messages such as heartbeat messages, as described above. The messages are transmitted to a backend such as metrics management platform 122 of FIG. 1 for further processing (e.g., for storage and/or computation of metric values).

Data Processing—Metric Computation and Storage

Figure 6:
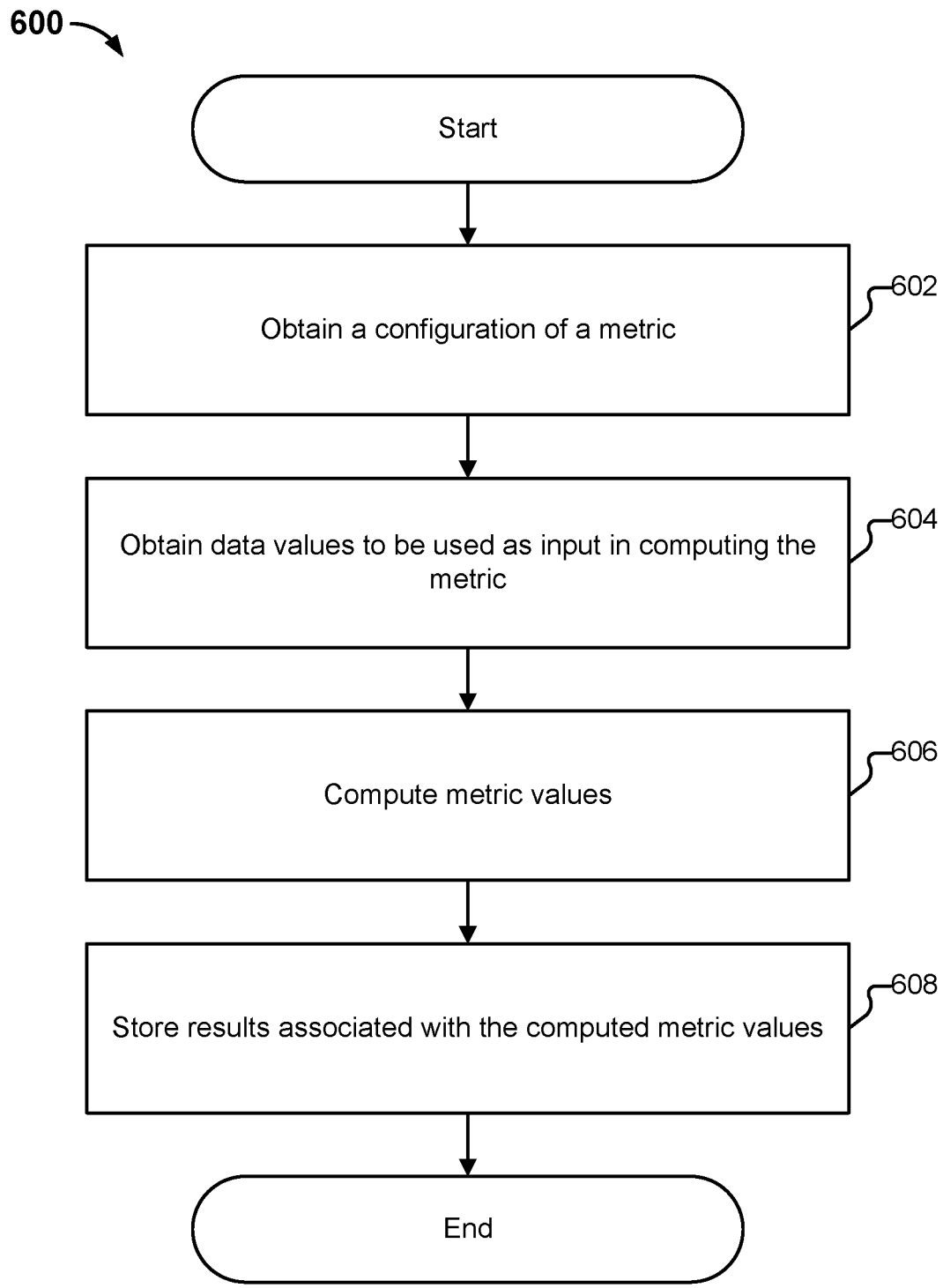
FIG. 6 is a flow diagram illustrating an embodiment of a process for computing a custom metric.

FIG. 6 is a flow diagram illustrating an embodiment of a process for computing a custom metric. In some embodiments, process 600 is executed by metrics management platform 122 of FIG. 1. The process begins at 602 when a metric configuration is obtained. For example, a metric configuration is obtained from a control module such as control module 102 of FIG. 1. An example of a metric configuration is shown at 204 of configuration 200 of FIG. 2 and described in conjunction with the example environment of FIG. 1. In some embodiments, the metrics configuration is configured using processes such as processes 430 and 460 of FIGS. 4B and 4C, respectively.

The metrics configuration includes a definition of how a metric is to be computed. For example, the definition includes a set of operations to be performed on a set of input data values. The metrics configuration also includes a mapping of collected data values to metric computation inputs. For example, each metric computation input is mapped to collected data values using the name (or any other appropriate identifier) of the collected data values (e.g., the name of the collected data value is directly specified as an input in the definition of the metric). In some embodiments, the configuration also includes a name of the configured metric.

At 604, the data values used as input in computing the metric are obtained, and at 606, metric values are computed according to the metric configuration. As one example, raw data values (identified by the name specified in the metrics definition) are extracted from heartbeats as they are received and used to perform real-time computation (e.g., using real-time computation engine 130 of platform 122 of FIG. 1).

As another example, metric values can be computed in an offline manner (e.g., using offline computation engine 132 of FIG. 1). For example, raw data collected from clients can be stored to a storage (such as persistent storage 134 of platform 122 of FIG. 1), and obtained using the names of the raw data specified in the metrics computation definition. Batch computation of metric values can then be performed by obtaining previously collected raw data values from such storage.

At 608, results associated with the computed metric values are stored. The results associated with the computed metric values can include the originally computed metric values and/or processed computed metric values, which can be grouped, aggregated, etc. according to the obtained metric configuration, as described above. For example, in some embodiments, metric configuration includes an indication of how computed metric values are to be stored, which can be based on how computed metric values are to be presented. As described above, computed metric values can be grouped (e.g., using collection, splitting, accumulation, etc.), stored as aggregations (e.g., sums), on a time-driven basis (e.g., daily, every five minutes, etc.), in a distribution (e.g., using histogram buckets), etc.

Based on the storage specification, dynamic schema generation can be performed. For example, suppose that a metrics configuration specifies that a daily sum aggregation of computed values of a particular metric is to be stored. A column can be instantiated in a database such as storage 138 of FIG. 1. The column is used to store daily sums of computed values for the metric. Each day, the sum total of the computed metric values for that data is computed and stored in a new row of the column generated for that day. In some embodiments, the original computed values are also maintained in storage. For example, a database column with the name of the configured metric can be instantiated in a storage such as storage 138 of FIG. 1. The computed metric values are then stored in the database column.

In some embodiments, if no storage configuration is specified in the metrics configuration, the computed metric values can be stored in a default manner (e.g., in a database column with the name of the configured metric that can be instantiated in a storage such as storage 138 of FIG. 1, as described above).

In some embodiments, the computed metric values are provided as output. For example, the computed metric values can be presented to users in dashboard reports via a user interface. In some embodiments, the stored results (which can include an aggregation of raw computed metric values, a distribution of the raw computed metric values, etc.) are provided as output (e.g., reported).

Validation

In some embodiments, validation is performed. For example, an end-to-end validation workflow operates in parallel to the custom data collection and/or metrics configuration, continuously monitoring data collection, data processing, and analytics modules to ensure that the complete custom configuration workflow is fulfilling specified requirements. For example, upon configuration of data collection and/or metrics, the results of the configuration can be validated. As one example, referring to the environment of FIG. 1, the results of the defined percentage complete metric can be validated against expected percentage completion values. The results of the validation can then be used to determine whether changes to the configuration of the collected data and/or metric should be modified (which can be performed using the techniques for custom configuration described herein). This allows, for example, for iterative debugging and analysis of custom configuration.

In some embodiments, performing validation includes generating a reference model. The output of the reference model is compared against what is being collected and computed. In some embodiments, generating a reference model includes establishing a test client. The test client is configured to behave in a particular manner. As one example, the test client can be configured to play content in a particular way. For example, in order to test the accuracy of the percentage completion metric, which uses play head time data collected every twenty seconds, the test client can be configured, at various times throughout a session, to play through a first portion of a content item, skip to another portion of the content item, pause for some time, then play another portion before stopping the viewing session.

The test client is then caused to play the video according to the test specification. The raw data values collected from the client are then used as input to compute the percentage completion metric. The test result is then compared against the expected result. If the results match (e.g., exactly, or within a threshold range), then the results are validated and the test is determined to be a success. If the results do not match, then the results are not validated and the results are determined to be a failure.

In some embodiments, alerts/notifications can be provided as output (e.g., to UI engine 104 of control module 102 of FIG. 1) based on the validation. For example, if the test is a failure, a user can be notified. Other alerts, such as emails, texts, or any other type of communication, as appropriate, can be provided. Thus, the test client/reference model can be used to provide feedback regarding data collection and metrics configuration. The user can evaluate the results of the test, for example, to perform iterative debugging and correct, if necessary, the data collection and/or metric configuration.

Figure 7:
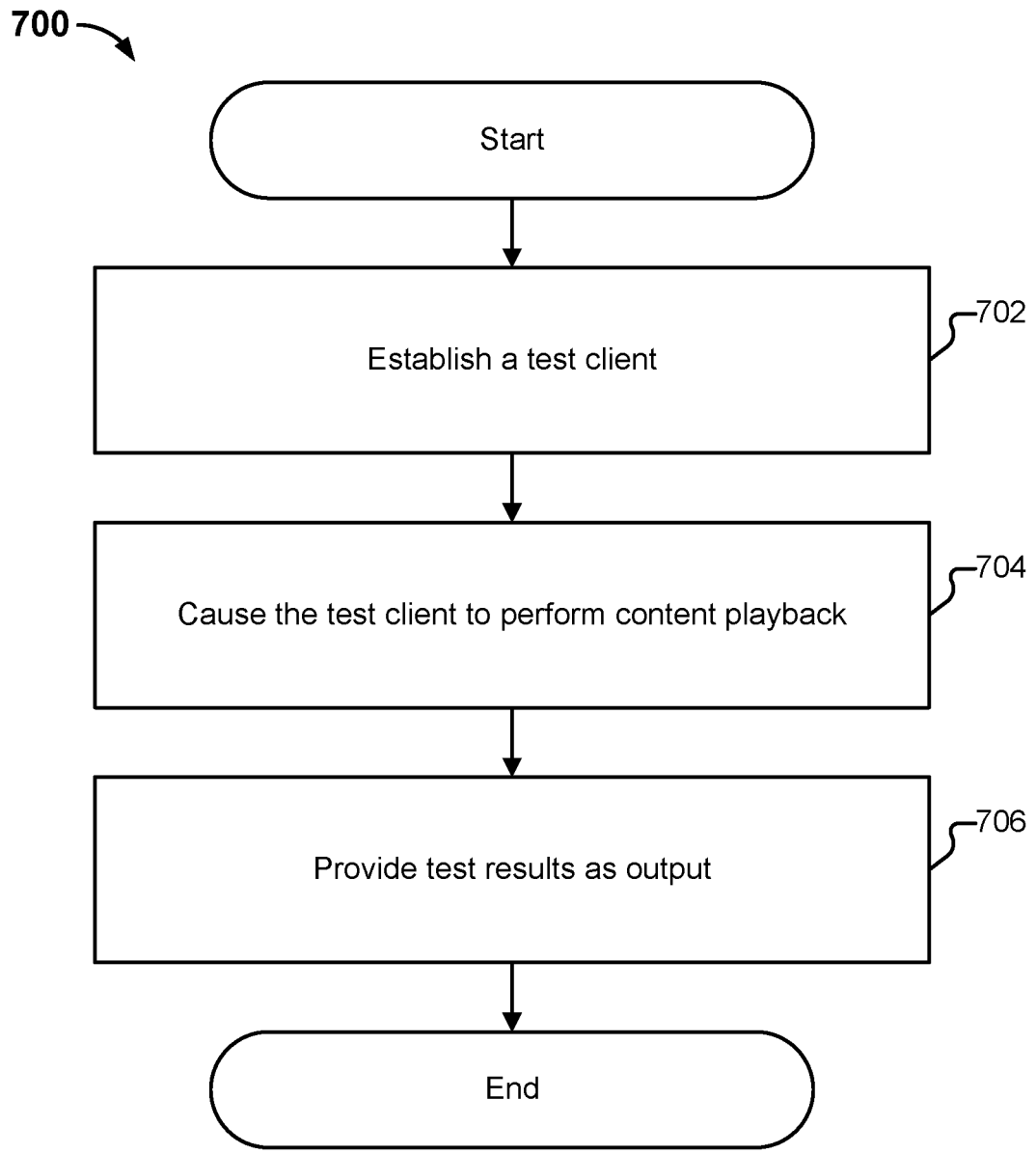
FIG. 7 is a flow diagram illustrating an embodiment of a process for performing validation.

FIG. 7 is a flow diagram illustrating an embodiment of a process for performing validation. In some embodiments, process 700 is executed using validation module 108 of control module 102 of FIG. 1. The process begins at 702 when a test client is caused to be established. In some embodiments, establishing the test client includes configuring playback behavior of the test client, as described above. In some embodiments, the test client is configured to perform data collection according to an obtained data collection configuration, as described above (but need not be—for example, the test client can perform default/existing data collection).

At 704, the test client is caused to perform video playback. For example, the test client is caused to perform video playback according to the playback behavior configuration. In some embodiments, raw data collected from the test client is passed to a backend such as platform 122, as described above. If metrics configuration is to be tested, metrics can be computed using raw data (which may or may not have been collected according to a custom configuration), and the values stored and/or provided for review.

At 706, results of the test are provided as output. For example, collected raw data and/or computed metric values that are of interest can be presented to a user in a dashboard (e.g., via a UI provided by UI engine 104 of control module 102 of FIG. 1).

In some embodiments, the results obtained at 706 are compared to an expected result that is computed for the test. Notifications can be sent to users based on the results of the comparison (e.g., alerts if the test and expected results do not match).

Data collection and metrics configuration can be tested together/concurrently and/or separately.

Scaling

The computation of new metrics and/or collection of new data can require increased resource usage. For example, more processing/computation (e.g., CPU) power and memory may be needed to handle the computation of new metrics. As another example, additional storage may be needed to handle the storage of new collected raw data and new computed metric values.

In some embodiments, a backend such as platform 122 of FIG. 1 is implemented as a scalable architecture/infrastructure. In the example of backend 122 of FIG. 1, the platform includes a custom scale controller 142 that is configured to facilitate/support the scaling of the metrics management platform. As one example, metrics management platform 122 is implemented using Amazon AWS. In this example, the custom scale controller is configured to utilize the AWS autoscaling API to scale up the resources utilized by the metrics management platform to accommodate the new metrics and/or data collection that has been configured. For example, an operator-user such as an IT personnel can monitor the resource utilization of the metrics management platform in response to the configuration of new metrics and/or data collection, and use the custom scale controller to notify the on-demand scaling to make resource capacity changes as necessary (e.g., to provision new nodes).

Thus, the utilization of resources in collecting new data/computing new metric values can be monitored and provided as feedback to determine whether resources should be scaled to accommodate the new data collection/metrics configuration.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   establish a test client;
   cause the test client to perform content playback according to a test configuration; and
   based at least in part on data obtained from the test client, determine whether to validate at least one of a data collection configuration and a metrics configuration, wherein the test client is configured to collect data according to the data collection configuration, wherein the data obtained from the test client comprises the data collected by the test client according to the data collection configuration, and wherein the data collection configuration specifies:
   a common name of a type of data value to be collected; and
   a plurality of different function calls usable to collect the type of data value from a plurality of different types of client devices, wherein raw data values collected using the plurality of different function calls are mapped to the common name specified in the data collection configuration; and
   a memory coupled to the one or more processors and configured to provide the one or more processors with instructions.

2. The system recited in claim 1, wherein the one or more processors are further configured to provide as output at least a portion of the data collected by the test client.

3. The system recited in claim 1, wherein the test configuration is used to configure playback behavior of the test client, wherein configuring playback behavior of the test client comprises configuring at least one of how the test client plays, pauses, stops, or skips with respect to a viewing session.

4. The system recited in claim 1, wherein the one or more processors are further configured to determine, according to the metrics configuration, a test metric result based at least in part on the data obtained from the test client.

5. The system recited in claim 4, wherein the one or more processors are further configured to provide as output the determined test metric result.

6. The system recited in claim 4, wherein determining whether to validate the metrics configuration comprises:
comparing the determined test metric result to an expected metric result; and
in response to determining, based at least in part on the comparing, a match between the test metric result and the expected metric result, validating the metrics configuration.

7. The system recited in claim 1, wherein the metrics configuration specifies:
a definition of computation of a metric; and
a mapping between a computation input and the collected data, wherein the computation input comprises the common name assigned to the type of the collected data.

8. The system recited in claim 1, wherein the one or more processors are further configured to transmit a notification in response to determining that the at least one of the data collection configuration and the metrics configuration is not validated.

9. A method, comprising:
establishing a test client;
causing the test client to perform content playback according to a test configuration; and
based at least in part on data obtained from the test client, determining, using one or more processors, whether to validate at least one of a data collection configuration and a metrics configuration, wherein the test client is configured to collect data according to the data collection configuration, wherein the data obtained from the test client comprises the data collected by the test client according to the data collection configuration, and wherein the data collection configuration specifies:
a common name of a type of data value to be collected; and
a plurality of different function calls usable to collect the type of data value from a plurality of different types of client devices, wherein raw data values collected using the plurality of different function calls are mapped to the common name specified in the data collection configuration.

10. The method of claim 9, further comprising providing as output at least a portion of the data collected by the test client.

11. The method of claim 9, wherein the test configuration is used to configure playback behavior of the test client, wherein configuring playback behavior of the test client comprises configuring at least one of how the test client plays, pauses, stops, or skips with respect to a viewing session.

12. The method of claim 9, further comprising determining, according to the metrics configuration, a test metric result based at least in part on the data obtained from the test client.

13. The method of claim 12, further comprising providing as output the determined test metric result.

14. The method of claim 12, wherein determining whether to validate the metrics configuration comprises:
comparing the determined test metric result to an expected metric result; and
in response to determining, based at least in part on the comparing, a match between the test metric result and the expected metric result, validating the metrics configuration.

15. The method of claim 9, wherein the metrics configuration specifies:
a definition of computation of a metric; and
a mapping between a computation input and the collected data, wherein the computation input comprises the common name assigned to the type of the collected data.

16. The method of claim 9, further comprising transmitting a notification in response to determining that the at least one of the data collection configuration and the metrics configuration is not validated.

* * * * *